Sept. 18, 1956     L. S. JUE     2,763,132
DEHUMIDIFYING APPARATUS
Filed Aug. 31, 1953
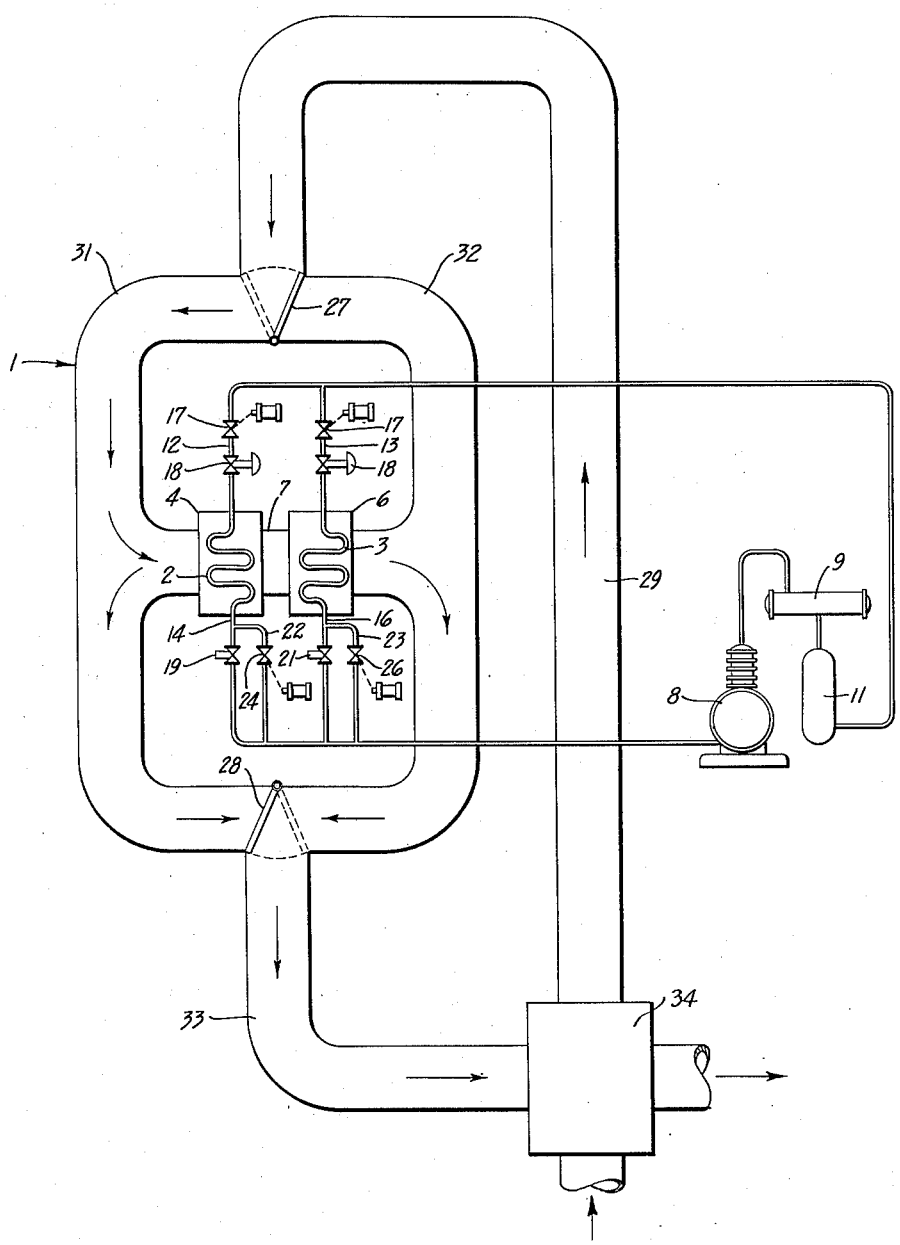
INVENTOR.
Lawrence S. Jue
BY George Sipkin
Paul U. Critchlow Jr.
ATTORNEYS United States Patent Office 2,763,132
Patented Sept. 18, 1956

2,763,132

DEHUMIDIFYING APPARATUS

Lawrence S. Jue, San Francisco, Calif.

Application August 31, 1953, Serial No. 377,739

6 Claims. (Cl. 62—6)

(Granted under Title 35, U. S. Code (1952), sec. 266)

This invention may be manufactured and used by or for the Government of the United States of America for governmental purposes without the payment of any royalties thereon or therefor.

This invention relates to methods and apparatus for dehumidifying gases and, more specifically, to methods of dehumidifying by refrigeration.

Gas dehumidification is used for many purposes, including the removal of moisture from refrigerants, the atmospheric conditioning of industrial plants and warehouses, the preservation of machinery and equipment and the "mothballing" preservation of ships. More recently, considerable attention has been devoted to the possibility of reducing oiler and tanker fuel storage fire hazards by purifying and dehumidifying the stack or flue gases of the vessels and then conducting these dehumidified inert gases into the storage tanks to replace the air atmospheres. Various dehumidification processes have been employed for these and other purposes and it has been found that depending on the conditions to be met, certain of these processes are much more appropriate than others. For instance, although the Navy's "mothballing" operations have utilized the well-known silica gel dehumidifiers, silica gel would not be appropriate for some other jobs, such as the dehumidification of flue gases, because the effectiveness of the silica gel is destroyed when subjected to the chemicals found in fuel, paints, etc.

Other means of drying gases include the use of refrigeration as a means for reducing gas temperatures to a degree sufficient to "freeze-out" any moisture that may be present, and, although such gas dehumidification is possible in most any situation, it too is subject to an operating deficiency in that the dehumidification must be periodically interrupted to permit defrosting of the refrigerant coils. Customarily, such defrosting is accomplished by subjecting the refrigerant coils to warm air or sprays of warm water adapted to melt the ice or frost and, obviously, when this defrosting is taking place, the dehumidification or freezing out of moisture on these coils cannot be accomplished so that the process cannot be continuous. Some attempt has been made at providing a continuously operating refrigerant dehumidification process, although these results apparently have not proven satisfactory. For example, an arrangement has been devised in which there is provided a separate by-passing refrigerant circuit into which both the refrigerant and the gases to be dehumidified can be shunted when it becomes necessary to defrost the refrigerant coils of the main circuit. As will be appreciated, any such process simply duplicates the apparatus already necessary for the gas dehumidification and, in doing so, it increases the installation and operating expenses to an extent which renders the apparatus relatively impractical.

It is, therefore, an object of the present invention to provide a continuously-operating gas dehumidification process which is capable of maintaining its effectiveness and efficiency in the presence of deleterious chemicals, such as are present in fuel, paint and the like.

A further object is to provide apparatus for dehumidifying gases by refrigeration principles, the apparatus being capable of continuous dehumidification accompanied by a continuous and simultaneous defrosting of the coils which have done the dehumidifying.

A more specific object is to provide a method of defrosting the refrigerant coils of a gas dehumidifying system in which the necessity of providing an independent and separately-heated defrosting fluid is avoided.

In a general manner, the invention is accomplished by mounting a pair of refrigerant coils in series in a gas conduit and by providing control mechanism capable of changing the temperature of these coils from freezing to non-freezing. In addition, suitable means are provided for circulating the gas through the conduit in reverse directions and the arrangement is such that gas circulating in one direction can be passed first over a coil which has a non-freezing temperature and then over a coil with a freezing temperature. Obviously, although the gas passing through the first coil would be partially dehumidified, no frost would be formed on this coil. However, the residual moisture in the gas is frozen out upon reaching the freezing coil, and in time frost will be built-up in sufficient amounts to render continuous operation inefficient. At such a time, the coil must be defrosted and one of the main features of this invention is that the defrosting can be accomplished without interrupting the dehumidifying process. This may be performed simply by simultaneously reversing both the direction of the flow of the gas and the temperature conditions of the coils. In the situation then prevailing the gas is passed first over a non-freezing coil, which, it will be recalled, is the coil which previously was maintained at a freezing temperature and which has become coated with frost, but, since this coil now is at a non-freezing temperature, the relatively warm gas is capable of quickly defrosting it. In addition, the other coil, which previously was the non-freezing coil, now is maintained at a freezing temperature so as to complete the dehumidification. Of course, frost then will form on this freezing coil of the reverse-direction flow, but this coil also can be defrosted when desired simply by again reversing gas flow direction and refrigerant coil temperatures. In practice, the various controls can be adapted for automatic operation so as to effectively meet prevailing conditions and to provide a continuously operating dehumidification and defrosting which requires no manual interference or periodical shutdowns.

The invention is illustrated in the figure of the accompanying drawing which schematically shows an arrangement adapted to accomplish the purposes of the invention.

Referring to the drawing, the apparatus includes a gas conduit 1 in which are mounted a pair of refrigerant coils 2 and 3, these coils being contained in casings 4 and 6 that are communicated one with the other by a short conduit section 7. Coils 2 and 3 form a part of a conventional refrigerant circuit which, in the customary manner, includes a compressor 8, a condenser 9 and a receiver 11, this circuit being adapted to circulate a refrigerant fluid such as Freon. Also, because of the use of the two coils 2 and 3, the refrigerant circuit requires separate inlet lines 12 and 13 and separate outlet lines 14 and 16; inlet lines 12 and 13 each mounting a solenoid valve 17 adapted to cooperate with other control mechanism in a manner to be described and a separate thermo-expansion valve 18 through which the refrigerant is expanded into the coils so as to reduce the temperature to the desired extent.

In addition, outlet lines 14 and 16 each mount separate temperature control elements and the provisions of these elements is one of the features of the present invention. As may be seen in the drawing, outlet line 14 mounts a back pressure valve 19, while outlet line 16 mounts a similar back pressure valve 21, both of these valves being relief valves adapted to elevate the cooling temperature of the coils by raising the pressure of the refrigerant in the coils above the suction pressure of the compressor. In addition, each of the outlet lines 14 and 16 branches off into by-pass lines 22 and 23, these by-pass lines containing solenoid-operated suction valves 24 and 26 so arranged that, in operation, if either of these suction valves is open, the refrigerant flow by-passes the corresponding one of the back pressure valves 19 or 21 and continues on freely to the compressor with the result that the temperature of the coil so affected will be determined entirely by the suction pressure control of the compressor. However, if either of the suction valves 24 or 26 is closed, the refrigerant flow must be through its corresponding back pressure valve 19 or 21, and, when such occurs, the refrigerant pressure being higher than the suction pressure of the compressor, the temperature in the corresponding coil automatically rises. The degree to which the temperature in the coils can be so elevated is controllable by the back pressure valve, and this control, as well as the control for the compressor itself may be operated according to well-known refrigerating principles. For purposes of the present invention, suction pressure of the compressor may be set so as normally to maintain a temperature of 0° F. in the coils, while back pressure valves 19 and 21 are adapted to elevate the 0° F. to a temperature of 33° F. Consequently, the gas passing through conduit 1 will be subjected either to a temperature of 0° F. or 33° F., depending upon the conditions which prevail in the control mechanism.

A further feature of this invention which cooperates with the particular type of refrigeration circuit already described is the fact that the gas flow in conduit 1 can be reversed at will so as to cause the gas either to flow from casing 4 into casing 6 or to flow in the opposite direction. The particular mechanism which circulates or moves the gas through the conduit is not illustrated in the drawing, although, depending upon the purpose for which the apparatus is used, the circulation can be effected either by a pump, by suitable fans, or by other well-known pressure mechanism. However, means for producing the reversal in the gas flow is an essential element of the apparatus and, as illustrated, it may be formed of dampers 27 and 28, or any other functionally equivalent members. As may be seen, gas conduit 1 is formed of a gas inlet line 29 adapted to receive the gas to be dehumidified and carry it to the coils, but, before reaching the coils, this line divides into separate branches 31 and 32, each of which centrally leads into coils casings 4 and 6, these branches also rejoining on the opposite side of the coil casings to form an outlet line 33 which carries the dehumidified gas into the space to be treated by the dehumidified gas. As may be noted, damper 27 is mounted in conduit 1 at the point where line 29 branches into lines 31 and 32, while damper 28 is mounted at the confluence point of these two branches. When the dehumidifying apparatus is operating, dampers 27 and 28 may be swung in any suitable manner either to cause the gas to flow in the direction indicated by the arrows or in the reverse direction. Most suitably, the actuation of the dampers is coordinated with the action of suction valves 24 and 26 to the extent that the reversal of flow and the reversal of temperature conditions occurs simultaneously. Such a coordination can be achieved in any conventional manner such as by the use of an electric motor in circuit with the valve solenoids, by pneumatic motors or, if desired, the dampers themselves can be powered by solenoids. Since the means for accomplishing this action forms a part of the invention, further detailed description or illustration is not believed to be indicated.

In practice, the apparatus thus far described can be used for many different purposes, and to facilitate description, it may be assumed that it is being used to dehumidify stack or flue gases so as to permit these gases to be introduced into fuel tanks. As previously indicated, such a use of the fuel gases is most desirable in the operation of sea-going tankers or oilers, since flue gases are inert and, when introduced into the storage tanks, they form a protective layer above the fuel such as will be particularly effective in avoiding fires. However, as will be appreciated, dehumidifying apparatus used in such a manner should operate continuously and without interruption for defrosting, and this continuous operation is particularly desirable when the dehumidifying apparatus is combined with other stack gas treated apparatus which itself functions in a continuous manner.

When stack gases are to be dehumidified, they are admitted into inlet line 29 from which they may flow either into branch 31 or 32, depending upon the position of damper 27. At the outset, damper 27 may be swung to such position that the flow is into branch 31 and, when the flow is in this direction, certain conditions must prevail in the refrigerant coils. Thus, suction valve 24 of refrigerant coil 2 should be closed so as to force the refrigerant into and through back pressure valve 19, thereby producing a temperature of 33° F. in coil 2 and coil casing 4. On the other hand, solenoid valve 26 should be opened, permitting the suction pressure of the compressor to freely act on the refrigerant in coil 3, whereupon the temperature of this coil is reduced to 0° F. As previously indicated, the solenoid control of the damper may be coordinated with the solenoid control of the coil so as to simultaneously effect this condition. With the conditions in the apparatus so arranged, the gas to be dehumidified first traverses coil 2 and, due to the 33° F. temperature of this coil, some of the moisture in the gas is condensed and may be drained off as water. By way of example, warm humid air, which may be assumed to be 85° F. with a relative humidity of 100% and a moisture content of 184 grains will, in traversing the 33° F. atmosphere of coil 2, have its temperature reduced to 60° F. and its moisture content to 78 grains. Of course, the relative humidity will remain at 100%. This reduced temperature gas then is admitted into coil 3 which is being maintained at 0° F. and, as might be expected, the residual moisture in the gas is frozen off on this coil so that the gas or air leaving the coil will have a temperature of 10° F. and a moisture content of 9 grains.

As may be appreciated, the air or gas is effectively dehumidified in its passage through coils 2 and 3, but, nevertheless, a heavy frost eventually will form on coil 3 so that, under normal circumstances, the apparatus would have to be shut down for a period sufficient to permit a defrosting. The present invention completely avoids such an interruption by simultaneously reversing the temperature conditions in the coils and the direction of flow of the gas and such a reversal may be accomplished manually or suitable automatic means can easily be provided to effect it. If automatic means are provided, e. g., a timer control, a solenoid will be actuated to swing dampers 27 and 28 into the positions illustrated by dotted lines in the drawing. Also, at the same moment, suction valve 26 will be closed by its solenoid and back pressure valve 21 opened. Further, suction valve 24 will be opened and back pressure valve 19 closed. As a consequence, the refrigerant pressure in coil 3 is raised to elevate the temperature of this coil to 33° F., while the refrigerant flow through coil 2 is unobstructed so as to permit its temperature to return to 0° F. With such temperature conditions prevailing, the humid gas or air at approximately 85° F. now is introduced first into the atmosphere of coil 3, which coil at this time is heavily frosted. However, the temperature of this coil now being 33° F. and the temperature of the incoming gas being 85° F., this heavy frost soon is melted and permitted to drain off as water. The gas leaving coil 3 then is introduced into coil 2 which now is at a freezing temperature so as to freeze out any residual moisture in the same manner as was described in the previous cycle. Of course, dehumidified gas leaving coil 2 or 3 is carried through the appropriate branch line into outlet line 33 which leads the gas into the fuel storage tank or into such other space as is to be treated.

A further feature of the present invention involves the use of a heat exchanger to substantially increase the efficiency of the operations. Thus, heat exchanger 34 is mounted in a casing which contains both the relatively hot inlet line 29 and the cold outlet line 33. With such a heat exchanger, the humid air entering the coils is substantially cooled so as to minimize the refrigeration requirements and, in addition, the cold air leaving the dehumidifier is advantageously heated before reaching the space to be treated.

The advantages of this invention now should be quite clear and, certainly, one of its more important attributes lies in the provision of a gas dehumidification process which is capable of utilizing refrigeration principles and which, at the same time, does not require any interruptions of its continuous operation for defrosting purposes. A further advantage of the apparatus resides in its ability to accomplish this result in an efficient manner such as should permit economic and effective operation. The apparatus and process described should be particularly useful in the dehumidification of stack gases either of the tankers and oilers or of industrial plants and warehouses. Further, it is contemplated that this process could be used for maintaining dry, preservative atmospheres in the vessels of the Navy "mothball" fleet, because the process can continue uninterruptingly and without constant maintenance. In brief, there is no present intent to limit the possible applications of the invention and, undoubtedly, many other similar uses probably will be apparent to those acquainted with special problems.

Obviously, many modifications and variations of the present invention are possible in the light of the above teachings. It is, therefore, to be understood that within the scope of the appended claims the invention may be practiced otherwise than as specifically described.

I claim:

1. Gas dehumidifying apparatus comprising a gas conduit including a pair of parallel branches and a third branch interconnecting said parallel branches at points intermediate their ends, first and second refrigerant coils mounted in said third branch, means for selectively maintaining freezing and non-freezing temperatures in both of said coils, and means for flowing said gas in reverse directions in said third branch, whereby gas flowing in one direction can be dehumidified by maintaining one of said coils at a freezing temperature and said one coil can be defrosted by increasing its temperature to non-freezing and reversing said gas flow direction, dehumidification of said reverse flow being accomplished by maintaining said other coil at a freezing temperature.

2. Gas dehumidifying apparatus comprising a gas conduit including a pair of parallel branches and a third branch interconnecting said parallel branches at points intermediate their ends, first and second refrigerant coils mounted in said third branch, means for maintaining freezing or near-freezing temperatures in both of said coils, and means for flowing said gas in reverse directions in said third branch, whereby gas flowing in one direction can be dehumidified by maintaining one of said coils at a freezing temperature and said one coil can be defrosted by increasing its temperature to near-freezing and reversing said gas flow direction, dehumidification of said reverse flow being accomplished by maintaining said other coil at a freezing temperature.

3. Gas dehumidifying apparatus comprising a gas conduit including a pair of parallel branches and a third branch interconnecting said parallel branches at points intermediate their ends, first and second refrigerant coils mounted in said third branch, means for flowing said gas in reverse directions in said third branch, means operable during gas flow in one direction for maintaining said first coil at a near-freezing and said second coil at a freezing temperature, and means operable during said reverse flow for maintaining said second coil at a non-freezing and said first coil at freezing temperature, whereby gas flowing in said one direction is dehumidified by the refrigeration of said second coil and gas flowing in said reverse direction is dehumidified by the refrigeration of said first coil, said gas flowing in said reverse direction also functioning to defrost said second coil.

4. Gas dehumidifying apparatus comprising a gas conduit including a pair of parallel branches and a third branch interconnecting said parallel branches at points intermediate their ends, first and second refrigerant coils mounted in said parallel branch, means for flowing said gas in reverse directions in said parallel branch, means operable during gas flow in one direction for maintaining said first coil at a near-freezing and said second coil at a freezing temperature, and means operable during said reverse flow for maintaining said second coil at a non-freezing and said first coil at a freezing temperature, whereby gas flowing in said one direction is dehumidified by the refrigeration of said second coil and gas flowing in said reverse direction is dehumidified by the refrigeration of said first coil, said gas flowing in said reverse direction also functoning to defrost said second coil, and a heat exchanger for elevating the temperature of gas leaving the frozen atmosphere of said coils by utilizing the heat of the gas flowing in reverse direction.

5. Gas dehumidifying apparatus comprising a gas conduit, means for flowing said gas in reverse directions in said conduit and a gas-dehumidifying refrigerant circuit, said circuit including first and second refrigerant coils, a compressor, a back pressure by-pass valve disposed between each coil and said compressor, and control means for said valve, said refrigerant circuit being capable of maintaining freezing temperatures in both of said coils, and said back pressure valves being alternately operable to elevate the temperature in either of said coils to near freezing, whereby gas flowing in said one direction is dehumidified by the refrigeration of said second coil and gas flowing in said reverse direction is dehumidified by the refrigeration of said first coil, said gas flowing in said reverse direction also functioning to defrost said coil.

6. A method of utilizing refrigerant coils for dehumidifying gases, the method including the steps of flowing gas in one direction past a pair of coils, maintaining the first coil at a near-freezing and the second at a freezing temperature, and then simultaneously reversing both the gas flow direction in the conduit and the temperatures of the pair of coils, the flow in said one direction producing frost about said freezing coil and the flow in the reverse direction defrosting said coil in response to gas temperature and to the reversal of said near-freezing temperature, said coil subjected to said near-freezing temperature acting at all times as a precooling dehumidifier and said other coil of the pair acting at all times as a final dehumidifier.

References Cited in the file of this patent

UNITED STATES PATENTS

| Number | Name | Date |
|---|---|---|
| 2,215,327 | Karsten | Sept. 17, 1940 |
| 2,252,739 | Stoever | Aug. 19, 1941 |
| 2,370,267 | Starr | Feb. 27, 1945 |
| 2,445,705 | Weinstein | July 20, 1948 |
| 2,481,348 | Ringquist | Sept. 6, 1949 |
| 2,522,484 | Ringquist | Sept. 12, 1950 |